United States Patent
Raulins

[15] 3,703,193
[45] Nov. 21, 1972

[54] VALVES
[72] Inventor: George Max Raulins, Dallas, Tex.
[73] Assignee: Otis Engineering Corporation, Dallas, Tex.
[22] Filed: Dec. 28, 1970
[21] Appl. No.: 102,004

[52] U.S. Cl.................137/630, 137/629, 251/63.4, 251/174, 251/315
[51] Int. Cl...............................F16k 11/16
[58] Field of Search....137/629, 630, 630.14, 630.15, 137/601; 251/63.4, 77, 315; 166/224, 226

[56] References Cited

UNITED STATES PATENTS

| 3,007,669 | 11/1961 | Fredd | 251/315 X |
| 3,249,124 | 5/1966 | Berryman | 137/629 |
| 3,583,442 | 6/1971 | Dollison | 137/629 X |

Primary Examiner—Robert G. Nilson
Attorney—E. Hastings Ackley

[57] ABSTRACT

A valve of the type wherein the valve closure member is operable by an actuator member movable longitudinally of a flow passage in the valve housing for opening and closing off flow through the passage, and particularly a rotary valve having a closure member rotatable between opened and closed positions with respect to a longitudinally movable tubular seat member having an external equalizing valve member thereon by means of which pressures are equalized on opposite sides of the valve closure member and the movable seat before movement of the valve closure member occurs in either opening or closing the valve, and wherein the equalizing valve has a smaller area exposed to the pressure in the flow passage to permit the equalizing valve to be moved from closed to open position before the rotary valve is opened whereby a lesser force is needed to fully open the valve.

18 Claims, 11 Drawing Figures

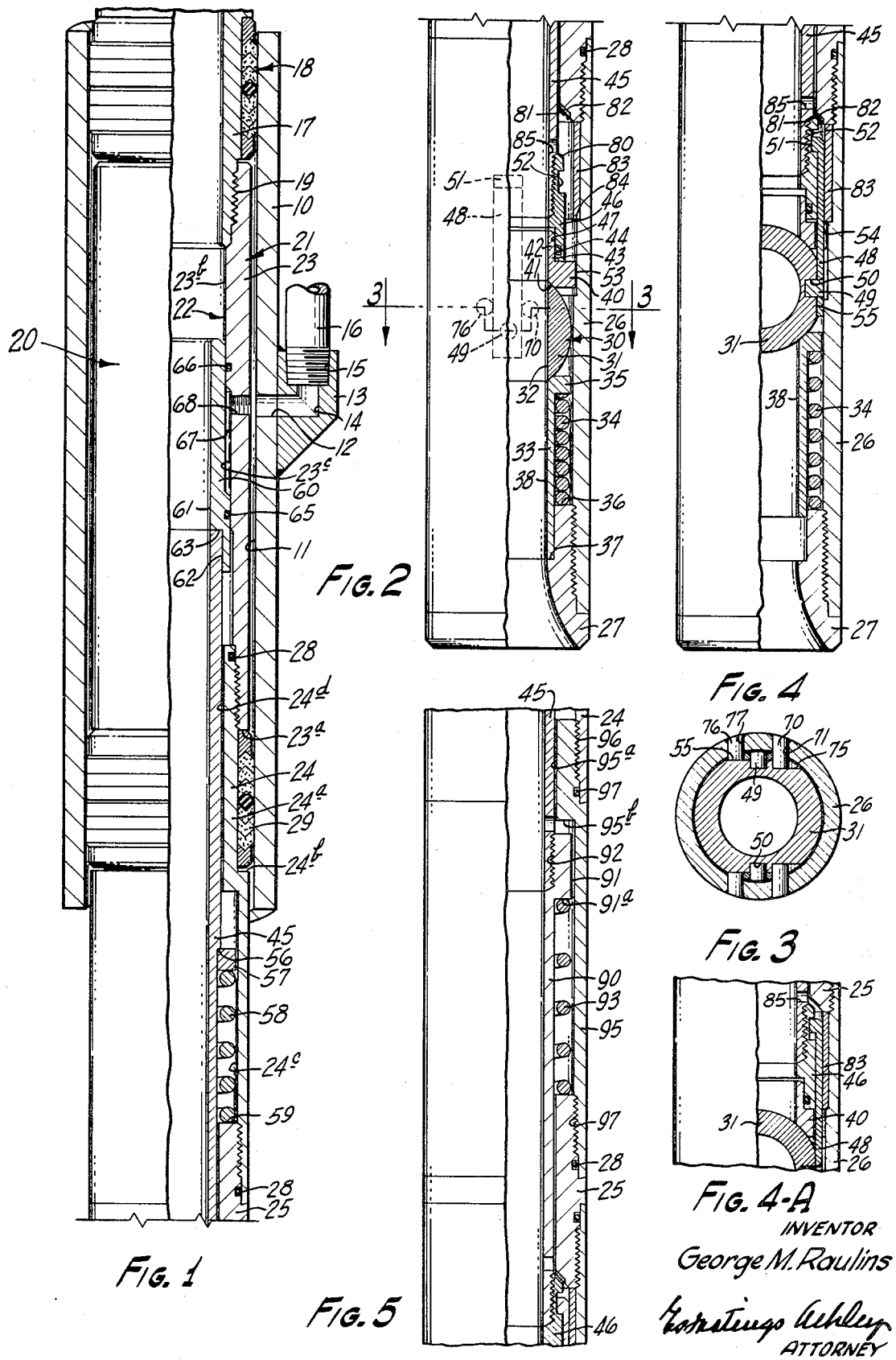

PATENTED NOV 21 1972

INVENTOR
George M. Raulins
ATTORNEY

VALVES

This invention relates to new and useful improvements in valves, and is more particularly directed to a rotary valve which is rotated between opened and closed positions as a result of longitudinal movement of the valve closure member with respect to the valve housing.

An important object of the invention is to provide in a ball valve, of the type in which the ball closure member is rotated with respect to a movable seat member in a housing upon longitudinal movement of the valve ball closure member with the movable seat with respect to the housing, means for equalizing fluid pressures on opposite sides of the ball valve closure member and the movable seat member before rotary movement of the ball valve closure member with respect to said seat member takes place.

A particular object of the invention is to provide, in a ball valve of the character described, means for actuating the ball valve to rotate the same including equalizing valve means between the movable seat and the valve housing for equalizing pressures on opposite sides of the ball valve and the movable seat member before the ball valve is rotated with respect to said seat member, including a lost motion connection between the ball valve actuating mechanism and the valve housing, and a by-pass passage past the ball valve and the movable seat member which is opened and closed by said equalizing valve structure upon movement of the operating mechanism before movement of the ball valve and seat with respect to the housing and before rotation of the ball closure with respect to the movable seat.

The principal object of the invention is to provide, in a valve of the character described, equalizing valve means operable by an actuator mechanism responsive to operating fluid pressure for opening and closing a by-pass passageway in the valve housing communicating the flow passage of the housing on opposite sides of the valve closure member, which equalizing valve structure has an area exposed to the fluid pressure in the flow passage of the valve housing which is substantially smaller than that of the valve closure member to permit opening the by-pass passageway by application of a small force to the equalizing valve structure before moving the valve closure member to opened position or closed position, whereby it is not required that the full pressure in the flow passage of the valve acting on the valve closure member and movable seat to be overcome to move the valve closure member from closed to opened position; and, wherein, the full pressure is not applied to the valve in moving it from opened to closed position until the valve closure member has been rotated to closed position, so that the valve closure member is not rotated under high pressure in its movements between opened and closed positions.

Still another object of the invention is to provide, in a valve of the character just described, means for operating the by-pass passage closure valve or control valve by an operating or control fluid pressure, whereby the structure of the equalizing valve permits the use of a pressure actuated operating mechanism of smaller size, and likewise permits the valve to be opened by application of a lesser operating fluid pressure than would be the case if the operating mechanism were required to move the entire valve from closed to open position under pressure acting across the full area of the valve.

A further object of the invention is to provide, in a ball valve of the character described, means for rotating the ball valve between opened and closed positions including means for equalizing the pressures across the ball valve and movable seat before rotary movement is applied to the ball valve for movement of the ball valve to either the open or closed positions, so that the valve is never rotated with a large fluid pressure differential existing across the ball valve closure member and movable seat during such rotation, thereby reducing wear on the ball valve closure member and the seat when the valve is operated under conditions of high pressure.

Still another object of the invention is to provide, in a rotary valve off the character described, operating means for actuating the equalizing valve structure and for actuating the valve closure member, in which the means for applying force to such operating mechanism may be modular and may be varied to the degree necessary to provide either a larger force or a smaller force, as desired.

A still further object of the invention is to provide, in a rotary valve of the character described, structure which permits equalizing of the pressures in the flow passage of the valve housing on opposite sides of the closure member prior to rotation of the rotary closure member, whereby the seating and surfaces between the closure member and the seat of the valve may be made of less expensive, more conformable materials which will effect a complete seal under lower pressures without wear on the closure member and seats which would otherwise result if the closure member were rotated with respect to the seat under the high fluid pressures across the full area of the valve closure.

Additional objects and advantages of the invention will be readily apparent from the reading of the following description of a device constructed in accordance with the invention, and reference to the accompanying drawings thereof, wherein:

FIG. 1 is a view partly in elevation and partly in section of the upper portion of a valve constructed in accordance with the invention showing the same located in a flow conductor;

FIG. 2 is a continuation of FIG. 1 showing the lower portion of the valve with the valve closure in open position;

FIG. 3 is a horizontal cross-sectional view taken on the line 3—3 of FIG. 2;

FIG. 4 is a view, similar to FIG. 2, of the valve showing the closure member rotated to closed position and the by-pass equalizing valve closed;

Figure 6:
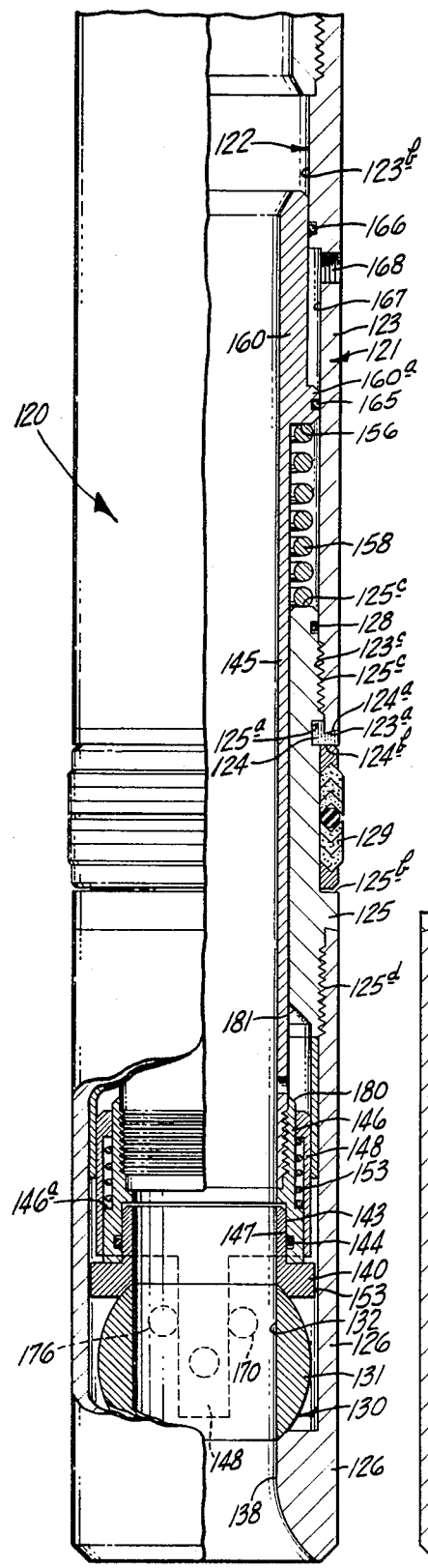
Figure 8:
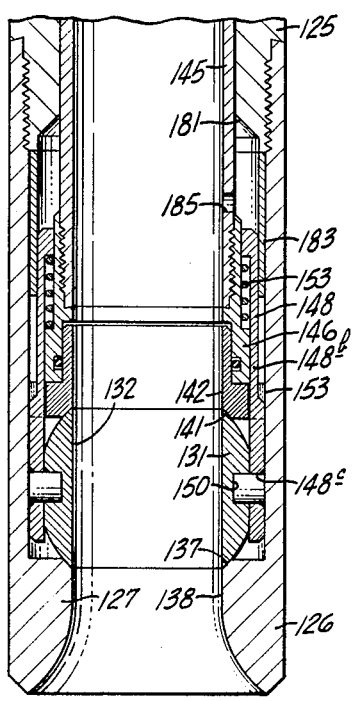
Figure 7:
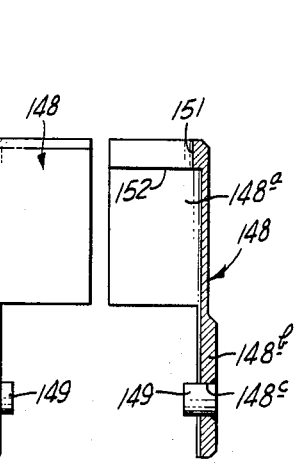
Figure 10:
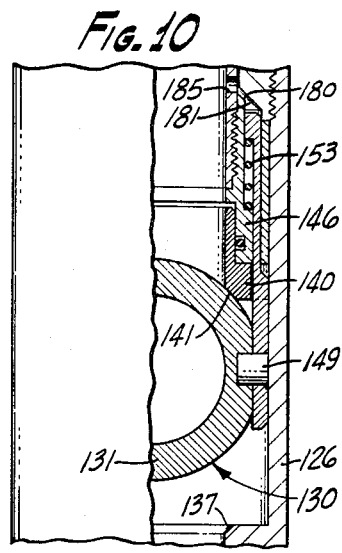
Figure 9:
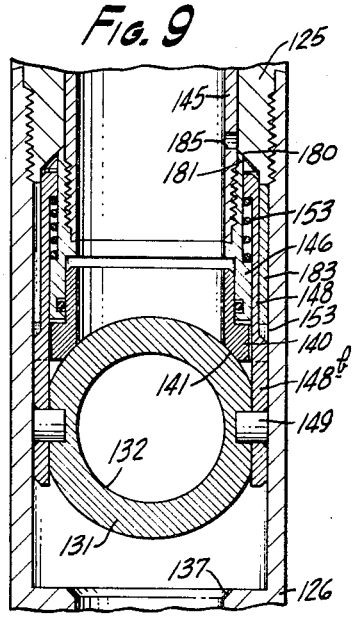

FIG.4-A is a fragmentary view, similar to FIG. 4, showing the equalizing valve in open position prior to rotation of the valve closure member to open position;

FIG. 5 is a view, similar to FIG. 1, of the upper portion of a valve showing an additional operating member module for controlling the force applied to the valve for biasing the same to closed position;

FIG. 6 is a view similar to FIGS. 1 and 2, showing a modified form of ball valve;

FIG. 7 is a view, partly in elevation and partly in section, of a portion of the actuator mechanism of the valve of FIG. 6;

FIG. 8 is a fragmentary vertical sectional view of the valve of FIG. 6, taken at 90 degrees to the showing in FIG. 6;

FIG. 9 is a fragmentary vertical sectional view of the valve of FIG. 6 showing the ball closure member moved to closed position showing the by-pass equalizing valve still open; and, FIG. 10 is a view similar to FIG. 9 and showing the valve in the closed position with the by-pass equalizing valve closed.

In the drawings, the numeral 10 designates a landing nipple of the type illustrated in the patent to Sizer et al, U.S. Pat. No. 3,157,233, issued Nov. 17, 1964, which is adapted to be mounted in a well flow conductor or tubing string (not shown) for the purpose of receiving and seating therein in sealing engagement therewith a well tool. The usual locking recesses and a sealing surface 11 intermediate its ends for receiving the sealing elements of the well tool are provided in the bore of the nipple. A lateral flow port 12 is formed in the wall of the sealing surface of the mandrel and a boss 13 having an angular or L-shaped flow path 14 therein is welded or otherwise suitably secured to the exterior of the landing nipple with the angular passage communicating with the lateral port 12 of the nipple. The boss has an enlarged threaded counterbore 15 at its upper end into which a control fluid conductor 16 may be connected for conducting operating or control fluid from the surface of the well or from another remote point to the bore of the landing nipple in the usual manner for actuating well tools disposed in the landing nipple.

As shown in FIG. 1, the valve of the invention is mounted on the lower end of a locking and sealing tool 17 having expansible locking dogs (not shown) thereon for engaging in the locking recesses in the landing nipple, as shown in the aforesaid patent, and having an upper packing or sealing assembly 18 on the exterior thereof for engaging and sealing against the sealing surface 11 of said landing nipple. The lower end of the tool is threaded as shown at 19 and receives thereon a valve assembly 20 constructed in accordance with the invention.

The valve assembly includes an elongate housing 21 threaded at its upper end for connection to the threads 19 at the lower end of the locking tool 17 and having a longitudinal axial bore 22 formed therein for flow of well fluids upwardly therethrough. The housing 21 consists of an upper supporting section 23, a packing section 24, a spring support and seat section 25, and a valve housing section 26 which is closed at its lower end by a bushing 27 threaded into the lower end of the base of the valve housing section. Each of the sections of the housing 21 are threaded at their upper ends into the lower end of the section immediately above and O-ring seal members 28 are disposed in suitable external grooves in the internal or pin portion of the sections for sealing between the pin portions of the sections in which the rings are mounted and the box portions of the sections therebelow and connected thereto. While the seal members 28 are of different diameter, they are each shown to be an O-ring seal designed to fit in the groove in which they are disposed and seal between the two adjacent housing elements.

The packing section 24 of the housing has a reduced upper portion 24a having an external annular packing assembly 29 thereon confined between the upwardly facing shoulder 24b at the lower end of said reduced portion and the lower end 23a of the supporting section 23 of the housing. The packing assembly 29 seals between the housing and the bore wall of the landing nipple providing the sealing surface 11 in said nipple. Thus, control fluid pressure entering the bore of the nipple 10 through the lateral inlet port 12 will be confined between the upper packing 18 of the locking and supporting tool 17 and the packing 29 on the exterior of the valve housing packing section 24.

Within the valve housing section 26, shown in FIG. 2, is a rotary valve closure assembly 30 comprising a ball or spherical valve closure member 31 having a flow passage 32 extending diametrically therethrough. Generally, the valve structure is similar to that shown in the patent to Fredd, U.S. Pat. No. 3,007,669, issued Nov. 7, 1961. The valve closure is supported on a lower movable tubular supporting seat 33 which is biased upwardly toward the valve closure in the housing section 26 by a helical coil spring 34 confined between an external annular flange 35 on the upper end of the seat and the shoulder 36 formed by the upper end of the bushing 27 threaded into the lower end of the housing section. The lower end of the slidable supporting seat engages an upwardly facing shoulder 37 formed in the midportion of the bore of the bushing for limiting downward movement of the seat and stopping the valve closure at a position in which the bore therethrough is in communication with the bore 38 of the supporting seat member. Above the ball closure member 31 is an upper movable seat member 40 having a concave seat 41 formed therein for engaging and sealing against the exterior spherical surface of the ball. The upper movable seat has a bore or flow passage 42 formed axially therein and communicating with the bore 32 of the ball valve closure 31 when the same is in the open position, shown in FIG. 2.

Above the upper movable seat 40 is an elongate tubular valve actuator sleeve 45 threaded at its lower end into a tubular link supporting bushing 46 having an enlarged bore 47 at its lower end into which the upper reduced end 43 of the movable upper valve seat 40 is slidable. An O-ring 44 is disposed in an internal annular groove formed in the enlarged bore of the connector support bushing 46 for sealing therebetween to direct flow of fluids upwardly from the bore of the movable upper seat into the bore of the tubular actuator sleeve. The ball closure member 31 is operatively connected to the actuator member bushing 46 by means of a pair of connector links 48 each having a support pin 49 welded or otherwise suitably secured to its lower end and engaging in a pair of diametrically opposed recesses 50 formed in the ball and each receiving one of the pins. The upper end of each connector link 48 has an inwardly projecting flange or finger 51 which is engaged in an external annular slot or groove 52 formed in the upper portion of the support bushing 46, as clearly shown in FIGS. 3 and 4. The groove 52 is wider than the longitudinal length of the inwardly extending fingers 51 on the connector links, so that the links may undergo a slight longitudinal movement with respect to the supporting bushing for a purpose which will be hereinafter more fully explained. The external annular flange 53 on the lower end of the upper movable seat 40 has a pair of diametrically opposed longitudinal slots 54 formed therein through which the connector links 48 extend downwardly to permit the pins 49 at the lower end of the connector links to be engaged in the diametrical recesses 50 in the ball closure member as shown in FIGS. 3 and 4. The ball is flattened on its opposite sides surrounding the recesses 50 to permit the links to ride along such flattened surface 55 and to provide room for the links within the housing as shown in FIGS. 3 and 4.

The actuator sleeve 45 is enlarged in diameter at its upper portion to provide a downwardly facing stop shoulder 56 intermediate its ends which is engaged by a stop ring or support ring 57 slidable onto the lower portion of the sleeve and engagable with the shoulder to provide a stop for a helical coiled spring 58 which is disposed in the enlarged lower portion of the bore 24c of the packing section 24 of the mandrel between said ring and the shoulder 59 formed by the upper end of the connector and seat section 25 of the housing. The force with which the spring is compressed is dependent upon the thickness of the ring 57, and such force may be adjusted by varying the thickness of the ring. The upper portion of the enlarged upper end of the actuating sleeve 45 is slidable in the reduced bore 24d of the packing section of the housing.

An operating piston 60 having a bore 61 which is enlarged in its lower portion at 62 is slidable in the support section 23 of the mandrel as shown in FIG. 1, and the enlarged lower bore 62 of such piston telescopes over the upper end of the actuator sleeve 45, the upper end of said sleeve abutting the downwardly facing shoulder 63 at the upper end of the enlarged bore 62 of the piston to limit downward movement of the piston with respect to the actuator sleeve, and vice versa. An O-ring seal member 65 is disposed in an external annular groove formed in the lower portion of the piston 60 and seals between the lower portion of the piston and the lower portion of the bore wall of the support and cylinder section 23 of the housing. The upper portion of the piston is reduced in external diameter and is slidable in the upper reduced bore 23b of the support section 23 of the housing, and an O-ring seal member 66 disposed in an internal annular groove formed in the bore wall of such reduced bore seals between the bore wall of the cylinder and support section of the housing and the upper reduced end of the piston. The bore of the support section 23 below the O-ring seal member 66 is enlarged in diameter as shown at 23c, and it is in this enlarged portion of the support section that the lower portion of the piston slides and against which the O-ring seal 65 seals between the bore wall and the lower larger portion of the piston 60. The offsets formed by the difference in external diameter of the piston and the difference in the bores of the support section provide a pressure chamber 67 in the intermediate portion of the cylinder and support section between the O-rings seals 65 and 66, and fluid pressure introduced into said chamber through a lateral port 68 formed in the wall of the support section 23 may act on the piston to urge the same downwardly against the upward force of the spring 58.

The operating fluid pressure introduced into the chamber 67 is conducted thereto from the bore 11 of the landing nipple between the sealing assemblies 18 and 29 of the valve tool 20 by means of the operating fluid conduit 16 and the angular passage 14 in the boss 13 and the lateral port 12 in the landing nipple. The effective area of the piston 60 upon which the operating fluid acts to bias the piston downwardly is that defined by the smaller upper O-ring 66 and the larger lower O-ring seal 65, and is the difference between the reduced upper portion of the piston and the enlarged bore 23c of the cylinder and support section. The actuating sleeve 45 is thus moved downwardly by the action of the operating fluid on the piston 60 against the upward biasing force of the helical coil spring 58 to operate the valve to move the same from closed to open position. The spring normally biases the actuating sleeve 45 upwardly to a position in which the valve is turned to a closed position in the valve housing section 26.

For turning the ball closure member 30, opposed operating or turning pins 70 are secured in aligned openings 71 formed in the wall of the housing section 26 by welding or in any other suitable manner. The inner ends of the turning pins 70 engage in angularly disposed grooves or slots 75 formed in the opposed flattened surfaces 55 of the ball closure member, and the engagement of the pins in such slots rotates the ball about the supporting pins 49 when the ball is moved longitudinally in the housing by the actuating sleeve 45 and the connector links 48. Guide pins 76 are disposed in aligned lateral openings 77 formed in the wall on opposite sides of the housing and these pins 76 are likewise welded or otherwise suitably secured in place in the openings. The pins terminate short of the flattened surfaces 55 of the ball closure member and are adapted to engage the sides of the connector links 48 opposite the sides engaged by the turning pins 70, so that the links are guided in their longitudinal movement in the housing section and the ball valve mechanism is prevented from rotation about the longitudinal axis of the housing.

A beveled seating surface 80 is formed on the upper end of the support bushing 46 and is adapted to engage a downwardly facing seat 81 formed in the lower end of the bore of the seat section 25 of the housing. The seat 81 may be provided with a hard facing material to prevent wear, if desired, and the seat 80 at the upper end of the bushing may likewise be hard surfaced to prevent wear. The seat wear surface 82 is shown clearly in FIGS. 2 and 4. Upward movement of the actuating sleeve 45 is therefore limited by the engagement of the upwardly facing seat 80 at the upper end of the bushing 46 with the downwardly facing seat 81 at the lower end of the seat section. Such engagement likewise closes off flow exteriorly of the actuator sleeve 45 through the bore 22 of the housing 21 while, at the same time, the ball closure member 31 rotated to the closed position shown in FIG. 4 closes the bore of the movable seat 40 to prevent flow upwardly through the bore of the actuating sleeve.

A stop sleeve 83 is disposed in an enlarged upper portion of the bore of the valve housing 26 and is confined between the shoulder 84 at the lower end of such enlarged bore and the lower end of the seat section 25 threaded into the upper end of the valve housing section 26.

When the ball valve is moved upwardly, the upper seat member 40 is likewise moved upwardly therewith until the external annular flange 53 thereon engages the lower end of the stop sleeve 83, as shown in FIG. 4, to stop further upward movement of the upper seat member and the ball valve closure member. There is further upward movement, however, of the actuating sleeve 45 and the supporting bushing 46 connected to the lower end of the actuating sleeve, until the seat 80 at the upper end of such bushing engages the seat 81 in the bore of the valve section 25 of the housing. The greater width of the slot 52 than the fingers 51 of the connecting links 48 permits such upward relative movement of the bushing 46 with respect to the connecting links so that the seats 80 and 81 may engage after upward movement of the ball closure member, while the upper movable seat 40 is held against upward movement by the engagement of the flange on such seat with the downwardly facing stop shoulder formed by the lower end of the stop sleeve 83.

An equalizing port 85 is formed in the wall of the actuating sleeve 45 just above the seat 80 on the upper end of the bushing 46, and, when the seat is engaged with the downwardly facing seat 81 in the seat section 25, fluids cannot flow in either direction through the equalizing port 85. However, when the actuating sleeve 45 is moved downwardly to move the seat 80 at the upper end of the support bushing 46 away from the downwardly facing seat 81 in the seat section 25 the equalizing port 85 is in communication with the bore 21 of the housing below the seat 81 and fluids may flow through the equalizing port to equalize the pressures on opposite sides of the ball valve closure member 31. The fluids will usually flow upwardly past the two seats and inwardly through the equalizing port 85 until the pressures above the ball closure and below the ball closure are substantially equal in which event the ball valve may be readily turned.

The seat 80 on the support bushing which engages with the seat 81 in the seat section of the housing, together with the equalizing ports 85, therefore provides an equalizing valve structure for controlling the flow of fluids past the closed ball closure member to equalize pressures on opposite sides thereof to permit the same to be turned between the upper and lower seat members 40 and 33 under substantially equalized pressure conditions at all times, whether the valve is moved to open or closed positions.

The pressure required to move the actuating sleeve 45 downwardly to open the equalizing valve provided by the seat 80 at the upper end of the support bushing and the seat 81 at the lower end of the seat section of the housing is the area defined between the diameter of the seating surfaces of the seats 80 and 81 when they are engaged and the diameter of the reduced upper portion 43 of the valve against which the O-ring 44 seals. The difference between these diameters may be very small and the area encompassed between them likewise small, so that a low pressure in the actuating fluid chamber 67 acting on the piston 60 will readily move the actuating sleeve 45 downwardly and open the equalizing valve assembly to permit the pressures on opposite sides of the ball closure to be equalized.

This arrangement is an improvement upon the valve of the patent to Dollison, U.S. Pat. No. 3,583,442, issued June 8, 1971, and permits the pressure of the operating fluid or control fluid acting on the piston to be substantially lower than that which would be required in the Dollison valve for moving the entire valve closure assembly with the full cross-sectional area of the valve closure member under pressure. For example, if the effective area of the piston 60 is equal to the differential area between the reduced upper end of the seat member 40 and the sealing engagement of the seats 80 and 81, then the pressure required to move the actuating sleeve downwardly would be equal to the pressure acting upwardly on the equalizing valve.

However, if the effective area of the piston is larger than the differential area between the equalizing valve seats and the reduced upper end of the seat member 40, a lesser operating or control fluid pressure may be utilized to open the equalizing valve. This permits the installation of the valve assembly at a deeper depth in the well, since the column of operating fluid or control fluid in the control fluid line 16 acting on the piston must be lifted in the control fluid line when the piston moves upwardly as the actuating sleeve is moved upwardly to move the ball closure member to closed position. Thus, the static pressure of the column of fluid in the control fluid line acting on the piston will control the depth at which the valve assembly may be located in the well, because the weight of the column of control fluid acting on the piston resists movement of the piston and the actuating sleeve to close the valve. Thus, the well pressure acting across the equalizing valve when it is closed will be acting upwardly against the smaller area or differential area of the piston and will so hold the piston upwardly against a higher column or greater column of control fluid in the control fluid line before the weight of the column of fluid would move the piston downwardly to open the valve. Therefore, the valve closure member will move to closed position when installed at a greater depth because the control fluid column weight is acting upon a piston having a smaller area, and exerting a smaller force tending to bias the actuating sleeve downwardly and the ball closure valve to open position.

To assure that the equalizing valve structure is maintained in the closed position under all operating conditions, as for example when the installation is a submarine well where a considerable column of salt water may enter the control fluid column line to act on the piston 60, tending to move the same downwardly to open the equalizing valve, the spring force biasing the actuating sleeve 45 upwardly, for rotating the closure member to closed position, may be increased as desired by adding biasing modules to the valve structure.

Such a module is illustrated in FIG. 5 and comprises an actuating sleeve lengthener sub or extension 90 which is threaded at its lower end into the support bushing 46 and has an enlarged external annular flange on its upper end provided with an enlarged threaded bore 91 into which the lower end of the actuator sleeve 45 is threaded. An additional helical coil spring 92, which may be identical to the spring 58 already described, is confined between the downwardly facing shoulder 91a at the lower end of the flange 91 and the upper end of the seat section 25 of the housing, in the same manner as the form first described. A housing extension 95 which is in all respects like the lower portion of the packing section 24 first described, has a reduced bore 95a at its upper end through which the actuator sleeve 45 slidably fits. The downwardly facing shoulder 95b at the lower end of the reduced upper portion 95a provides a stop for the upper end of the actuator sleeve extension 90, limiting upward movement of said extension in the event the support bushing 46 is disconnected from the lower end of said extension. The housing extension is externally threaded on its upper reduced end 96 and is threaded into the internal threaded bore at the lower end of the packing section 24 of the valve housing 21 already described. An O-Ring seal 97 is disposed in an external annular groove on the reduced pin section 96 of the housing extension for sealing between such housing extension and the lower end of the packing section 24 of the housing. Similarly, the O-ring 28 on the seat section 25 seals against the bore wall at the lower threaded end 97 of the housing extension. Obviously, if desired, more than one of the extension modules may be incorporated in the valve assembly 20 to provide any desired force of the springs biasing the actuator sleeve upwardly against the pressure of the control fluid acting on the piston, and so provide a positive shifting of the equalizing valve structure and rotary valve mechanism at the lower end of the actuating sleeve and housing.

This type structure permits use of the tool at greater depths in the well at which control fluid pressure is greater due to the length of the column of control fluid in the control fluid line acting on the piston, or due to the hydrostatic head of sea water in the event the control fluid line should become damaged or broken to admit sea water into the control fluid to act on the piston 60. In either case in order for the valve to close and to maintain the equalizing valve close, the actuating sleeve must move the piston upwardly against the column of fluid acting thereon and providing sufficient spring force acting on the actuating sleeve will effect such movement.

A slightly modified form of the valve is shown in FIGS. 6 through 10, inclusive, wherein the valve assembly 120 is adapted to be mounted in the landing nipple 10 in the same manner as that of the form first described. The valve housing 121 is formed of an upper cylinder and support section 123, a packing carrying and valve seat section 125 and a lower valve housing section 126. The housing has a longitudinal flow passage or bore 122 through which well fluids may flow in the same manner as in the form of the device first described.

An external packing assembly 129 is mounted on the exterior of the packing and seat section 125 and is confined between an upwardly facing shoulder 124b and the lower end of a split locking ring 124 which is confined in an external annular recess 125a in the packing and seat section 125 below the externally threaded end section 125c which is threaded into the internally threaded lower box section 123c of the upper support section 123 of the housing. A seal shoulder 123a, which is beveled downwardly and inwardly at the lower end of the support section 123, engages an undercut seal surface 124a formed on the upper outer portion of the split locking ring 124. The lower end of the support section 123 may therefore be made up tightly against the locking ring to lock the section 123 to the packing section 125 and to hold the lock ring 124 securely in place in the recess 125a. The lower surface 124d of the lock ring provides a stop shoulder confining the packing assembly 129 on the exterior reduced portion of the mandrel between such surface and the upwardly facing shoulder 125b on the packing and seat section of the housing. An O-ring seal member 128 seals between the upper pin end of the seat section 125 and the box in the lower end of the support section 123. The lower reduced end pin section 125d of the packing and seat section 125 is threaded into the upper threaded bore of the valve housing section 126, and the lower end of the bore of the seat section 125 is provided with a downwardly facing seat 181 adapted to be engaged by the upwardly facing seat surface 180 at the upper end of the support bushing 145 threaded onto the lower end of the actuating sleeve 145. An equalizing port 185 is formed in the wall of the sleeve above the upper end of the bushing 146 and above the upwardly facing seat 180 on the support bushing.

A piston 160 is formed integral with the upper end of the actuating sleeve 145 and has an external annular flange 160a at its lower end provided with an external annular groove in which an O-ring seal member 165 is disposed for sealing between such flange and the bore wall of the control fluid chamber 167 in the cylinder and support section 123 of the housing. The control fluid inlet port 168 admits control fluid into the chamber 167 for acting on the piston. The upper portion of the piston 160 is externally reduced in diameter at 160a and the bore 123b of the support section 123 is provided with an internal annular recess above the port 168 and above the lower end of the upper reduced portion 123b of such bore in which an O-ring seal member 166 is disposed to seal between the reduced upper portion of the piston and the reduced 123b of the cylinder and support section 123.

Thus, the differential area between the exterior of the upper reduced portion 160a of the piston and the large lower bore wall 123c against which the O-ring 165 seals provides an effective operating area of the piston upon which the control fluid acts to move the piston downwardly against the upward force exerted on the piston and on the actuating sleeve by the helical coil spring 158 confined between a shoulder 156 at the lower end of the flange 160a of the piston and the upper end of the upper pin portion 125c of the packing and seat section 125. The spring therefore biases the piston upwardly against the action of the control fluid thereon, and so moves the actuating sleeve 145 upwardly until the seat 180 on the support bushing 146 engages the downwardly facing seat 181 in the lower end of the bore of the seat and packing section 125 to limit upward movement of the actuating sleeve and piston in the housing.

The lower portion of the bore of the support bushing 146 is enlarged as at 147 to receive the upper reduced portion or neck 143 of the movable seat member 140 and an O-ring seal 144 is disposed in an internal annular groove in such enlarged bore for sealing between the reduced upper portion of the seat member and the support bushing while permitting the seat member to move longitudinally axially with respect to the support bushing in the same manner as in the form first described.

Supporting link members 148 have semi-cylindrical upper portions 148a provided with internally projecting flange members 151 which provide downwardly facing shoulders 152 for confining a helical coil spring 153 between such shoulders 152 and an upwardly facing external annular shoulder 146a on the support bushing, whereby the support links 148 are biased upwardly with respect to the support bushing. Opposed inwardly projecting supporting pins 149 are welded or otherwise secured in openings 148c in the lower depending link portions 148b of the supporting link members 148, and these pins are engaged in the diametrically opposed recesses 150 on opposite sides of the ball closure member 131. The pins extend inwardly into the diametrically opposed openings 150 in the ball closure 131 and provide for rotation of the ball about the axis defined by those pins and openings between the open position shown in FIGS. 6 and 8 and the closed positions shown in FIGS. 9 and 10.

Turning pins 170, shown in dotted lines in FIG. 6, engage in angularly disposed slots, (not shown) in the flattened surfaces 155 of the ball closure member surrounding the diametrically opposed openings 150 and function in the same manner as the turning pins 70 of the form previously described. Guide pins 176 are provided on the housing and engage the depending link sections 148b of the connecting link members 148 for guiding the same in the longitudinal movement in the housing.

An internal annular flange 127 formed in the lower portion of the well housing section 126 provides a concave stop seating surface 137 which engages the ball closure member 131 when the same is in its lower position in the housing to stop downward movement thereof with the transverse flow passage 132 through the ball closure member in alignment with the bore 138 through said flange. The flow passage through the ball is also aligned with the bore 142 in the upper movable seat 140. The upper movable seat has an external annular flange 153 on its lower end which engages the lower end of a stop sleeve 183 secured in the bore of the valve housing section 126 below the lower end of the seat section 125 to limit upward movement of the upper movable seat 140 to stop upward movement of the movable seat member and the ball valve closure 130 in the housing before the upwardly facing seat 180 at the upper end of the supporting bushing 146 engages the downwardly facing seat 181 at the lower end of the seat and packing section 125 in the manner already described.

The spring 153 permits longitudinal relative movement of the actuating sleeve 145 upwardly, after upward movement of the seat member 140 is stopped by engagement of the flange 153 with the lower end of the stop sleeve 183, whereby the seat 180 may move upwardly into engagement with the downwardly facing seat 181 in the seat section of the housing to close off flow exteriorly of the actuating sleeve through the by-pass equalizing port 185 in the sleeve. The spring 153 likewise biases the supporting link member 148 upwardly to bias the ball closure member 130 into engagement with the downwardly facing concave seat 141 at the lower end of the upper movable seat 140, and likewise moves the ball upwardly into engagement with said seat when the actuating member 145 is moved upwardly.

In this form of the device, when the valve is moved from the open position shown in FIG. 6 toward the closed position shown in FIGS. 9 and 10, the external flange 153 on the seat member 140 engages the lower end of the stop sleeve 183 to limit upward movement of the upper movable seat member and the valve closure member before the seat 180 at the upper end of the support bushing engages the downwardly facing seat 181 in the seat section of the housing. The actuating sleeve may be moved further upwardly by the spring 158 until the seats 180 and 181 are in engagement as shown in FIG. 9 to close off flow through the by-pass port or equalizing port 185.

The actuating sleeve 145 may be moved downwardly by operating fluid pressure in the chamber 167 acting on the piston 160 to move the support bushing 146 downwardly and so move the upwardly facing seat 180 away from the seat 181 and open the by-pass passage or equalizing port 185 to permit fluids from below the valve to move therethrough to the bore of the housing above the valve to equalize pressure across the closed ball valve member in the same manner as in the form previously described.

The function and operation of the valve is substantially identical to that of the form first described except for the structural difference pointed out in describing the construction of the valve.

It will therefore be seen that a new and improved rotary valve has been provided which is moved between open and closed positions only under conditions of substantially equalized pressures across the valve closure member. It will particularly be noted that an equalizing valve structure has been provided which controls the flow of fluids therethrough for equalizing pressures across the closed main valve closure member to permit such main valve closure to be moved under conditions of equal pressure above and below the same. In all forms of the valve described, the area of the control fluid operating piston may be reduced substantially, since only the differential area between the diameter of the seating engagement of the seats 180 and 181 and the diameter of the upper reduced portion of the movable valve seat is exposed to pressure in the valve housing upstream of the equalizing valve structure, so that a smaller piston may be used to open the equalizing valve to equalize pressures on opposite sides of the rotary valve closure member.

The foregoing description of the invention is explanatory only, and changes in the details of the constructions illustrated may be made by those skilled in the art, within the scope of the appended claims, without departing from the spirit of the invention.

What is claimed and desired to be secured by Letters Patent is:

1. A valve including: a housing having a flow passage therethrough; valve means comprising main valve closure means and seat means movable in said housing for closing off flow through the flow passage of said housing; valve actuating means movable longitudinally in said housing for moving said valve means for opening and closing said main valve means; equalizing valve means on said housing and said actuating means openable upon longitudinal movement of said valve actuating means without moving said main valve means in said housing and prior to movement of said main valve means between closed and open positions to admit fluid pressures to opposite sides of said main valve means to equalize pressures thereon prior to opening said main valve means and closable upon longitudinal movement of said actuating means without moving said main valve means in said housing and after movement of said main valve means between open and closed positions; said actuating means actuating said equalizing valve means independently of the actuation of said main valve means.

2. A valve of the character set forth in claim 1 wherein said main valve means comprises a rotary plug closure, movable seat means engageable with said rotary plug closure and having fluid flow conducting communication with the housing whereby said rotary closure controls flow through said seat means and said housing; and means connecting said valve actuating means with said rotary plug closure for rotating said plug closure between open and closed positions.

3. A valve of the character set forth in claim 2 wherein said rotary plug closure and movable seat means are movable longitudinally of said housing by said valve actuating means between a position in which said main valve closes said housing flow passage and a longitudinally spaced position in which said flow passage is opened; means on said housing and said seat means coengageable to limit movement of said seat means and rotary plug closure in closed position and permitting further limited longitudinal movement of said valve actuating means in said housing; said valve actuating means being operable for opening and closing said equalizing valve means during such further longitudinal movement of said valve actuating means while said rotary plug closure and seat means are held stationary in closed position.

4. A valve of the character set forth in claim 2 wherein said equalizing valve means comprises valve and seat means and equalizing flow passage means on said valve actuating means and said housing spaced from said rotary plug closure means and seat means and movable into and out of position opening and closing off flow through said equalizing flow passage means independently of movement of said rotary plug closure means and seat means when said rotary plug closure means and seat means is closed to permit equalizing pressures in the valve flow passage on opposite sides of said rotary plug closure means and seat means in closed position.

5. A valve including: a housing having a flow passage therethrough; main valve means comprising valve closure means and seat means movable in said housing for opening and closing off flow through the flow passage of the housing; valve actuating means movable longitudinally in said housing for actuating said main valve means between positions in which said flow passage is open and closed; equalizing valve means on said valve actuating means and said housing openable and closable upon longitudinal movement of said valve actuating means relative to said housing independently of movement of said main valve means by said actuating means to establish or close a flow passage past said main valve means without moving said main valve means in said housing when said main valve means is closed.

6. A valve of the character set forth in claim 5, including: fluid pressure responsive means on said valve actuating means and said housing forming a cylinder and a piston movable therein having a surface exposed to operating fluid pressure from a source exteriorly of the valve for moving said valve actuating means in response to such pressure acting on said piston; said piston of said pressure responsive means being of an area equal to or slightly greater than the area of the equalizing valve means exposed to pressure in the valve housing flow passage when in closed position.

7. A valve of the character set forth in claim 5 including: resilient means in said valve housing operatively connected with said valve actuating means for biasing said actuating means to the position in which the flow passage through said tubular sleeve is closed by said main valve means; and means for operatively connecting in said housing a plurality of modules of resilient means with said valve actuating means for applying varied biasing force to said valve actuating means.

8. A valve including: a housing having a flow passage therethrough; main valve means comprising closure means and seat means movable in said housing for closing off flow through the flow passage of said housing; valve actuating means movable longitudinally in said housing for moving said main valve means between open and closed positions; equalizing valve means openable and closable upon longitudinal movement of said valve actuating means independently of movement of said main valve means by said actuating means for communicating said flow passage of said valve housing with opposite sides of said main valve means without moving said main valve means longitudinally in said housing while said main valve means is in closed position; and pressure responsive means in said housing and on said valve actuating means operable to move said valve actuating means to open said equalizing valve means without opening said main valve means.

9. A valve of the character set forth in claim 8 wherein: the area of said equalizing valve means exposed to pressures on opposite sides thereof in the flow passage of the valve housing is substantially smaller than the area of said main valve means exposed to pressures in said flow passage of said housing, whereby said equalizing valve means may be moved to open position by a relatively small fluid pressure applied to said pressure responsive means for moving said valve actuating means to open said equalizing valve means.

10. A valve of the character set forth in claim 8 including: resilient means in said valve housing operatively connected with said valve actuating means for biasing said actuating means to the position in which the flow passage is closed by said main valve means; and means for operatively connecting in said housing a plurality of modules of resilient means with said valve actuating means for applying varied biasing force to said valve actuating means.

11. A valve including: a housing having a flow passage therethrough; an internal annular valve seat in said housing surrounding said flow passage; an elongate tubular actuating sleeve movable longitudinally in the valve housing flow passage and having an external annular seat thereon movable therewith into and out of seating engagement with said internal annular valve seat in said housing for controlling flow through said housing exteriorly of said actuating sleeve; main valve means including valve closure means and valve seat means longitudinally movably connected with said tubular sleeve and movable thereby between positions opening and closing off flow through said tubular sleeve; a lateral flow port in said sleeve on the side of the external seat thereon opposite said valve closure means for conducting fluid pressure between the interior and exterior of the sleeve on such side of said external seat; and means for moving said external seat on said sleeve into and out of engagement with said internal seat in said housing longitudinally movable connection of said main valve means to said tubular actuating sleeve permitting such movement of said external seat with respect to said internal annular valve seat in said housing without movement of said main valve means longitudinally in said housing.

12. A valve including: a housing having a flow passage therethrough; main valve means movable longitudinally a limited distance in said housing for opening and closing off flow through the flow passage of said housing; valve actuating means operatively connected with said main valve means for limited longitudinal movement with respect to said main valve means and further movable longitudinally in said housing for moving said main valve means between positions opening and closing said passage of said housing; means on said housing and said main valve means co-engageable for limiting movement of said main valve means toward closed position to a position in which said main valve means is closed; said longitudinally movable connection between said actuating means and said main valve means permitting movement of said actuating means a limited distance longitudinally with respect to said housing after said main valve means has been stopped in closed position in said housing; and equalizing valve means openable and closable upon such limited further longitudinal movement of said valve actuating means in said housing for communicating the flow passage of said housing on opposite sides of said main valve means when said main valve means is in closed position for equalizing pressures across said main valve means while the same is closed.

13. A valve of the character set forth in claim 12 including: fluid pressure responsive means on said housing and said valve actuating means operable by control fluid pressure applied thereto from a remote source for moving said valve actuating means longitudinally of said housing to open said equalizing valve means before said main valve means is moved longitudinally in said housing whereby fluid pressures on opposite sides of said main valve means are equalized while said main valve is closed and before said main valve means is moved longitudinally of said housing to open the same.

14. A valve of the character set forth in claim 12 including: resilient means in said valve housing operatively connected with said valve actuating means for biasing said actuating means to the position in which the flow passage is closed by said main valve means; and means for operatively connecting in said housing a plurality of modules of resilient means with said valve actuating means for applying varied biasing force to said valve actuating means.

15. A valve of the character set forth in claim 12 including: resilient means in said valve housing operatively connected with said valve actuating means for biasing said actuating means to the position in which the flow passage is closed by said main valve means; and means for operatively connecting in said housing a plurality of modules of resilient means with said valve actuating means for applying varied biasing force to said valve actuating means, said resilient means biasing said actuating means through such further longitudinal movement in said housing for biasing said equalizing valve means to closed position.

16. A valve including: a housing having a flow passage therethrough; an internal annular valve seat in said housing surrounding said flow passage; an elongate tubular sleeve movable longitudinally in said housing flow passage and having an external annular seating shoulder thereon movable longitudinally therewith into and out of seating engagement with said internal annular valve seat to close off flow through said housing exteriorly of said sleeve; main valve seat means movable longitudinally in said housing and having a longitudinally movable operating connection in sealed flow communication with said tubular sleeve; rotatable main valve closure means engaging said main valve seat means and movable therewith in said housing between positions closing off fluid flow through said tubular sleeve and opening said tubular sleeve to fluid flow therethrough; and an equalizing flow port in the side wall of said tubular sleeve on the side of said external annular seating shoulder thereon opposite said main valve seat means and said rotatable valve closure means; means on said movable main valve seat means engageable with said housing for limiting movement of said movable main valve seat means and main valve closure means in a position in said housing in which they close off flow through said sleeve; said tubular sleeve being further movable longitudinally in said housing with respect to said main valve seat means to engage said annular seating shoulder on said sleeve with said internal annular valve seat in said housing to close off flow through said equalizing valve means after said rotatable main valve closure and movable main valve seat means are stopped in closed position, and said annular seating shoulder being movable out of engagement with said internal annular valve seat in said housing to open said equalizing port for flow therethrough without moving said rotatable main valve closure and main valve seat means longitudinally of the housing from closed to open position.

17. A valve of the character set forth in claim 16 including: resilient means in said valve housing operatively connected with said valve actuating means for biasing said actuating means to the position in which the flow passage is closed by said main valve means; and means for operatively connecting in said housing a plurality of modules of resilient means with said valve actuating means for applying varied biasing force to said valve actuating means.

18. A valve of the character set forth in claim 16 including: resilient means in said valve housing operatively connected with said valve actuating means for biasing said actuating means to the position in which the flow passage is closed by said main valve means; and means for operatively connecting in said housing a plurality of modules of resilient means with said valve actuating means for applying varied biasing force to said valve actuating means, said resilient means biasing said actuating means through such further longitudinal movement in said housing for biasing said equalizing valve means to closed position.

* * * * *

PO-1052
(5/69)

UNITED STATES PATENT OFFICE
CERTIFICATE OF CORRECTION

Patent No. 3,703,193  Dated November 21, 1972

Inventor(s) George Max Raulins

It is certified that error appears in the above-identified patent and that said Letters Patent are hereby corrected as shown below:

Column 2, line 16, cancel "off" and insert --of--

Column 15, line 6, after "housing" insert --, said--

Signed and sealed this 15th day of May 1973.

(SEAL)
Attest:

EDWARD M. FLETCHER, JR.
Attesting Officer

ROBERT GOTTSCHALK
Commissioner of Patents